L. C. JOSEPHS, Jr.
MOTOR TRUCK EXCAVATOR.
APPLICATION FILED MAY 27, 1920.
1,388,650.
Patented Aug. 23, 1921.
2 SHEETS—SHEET 2.
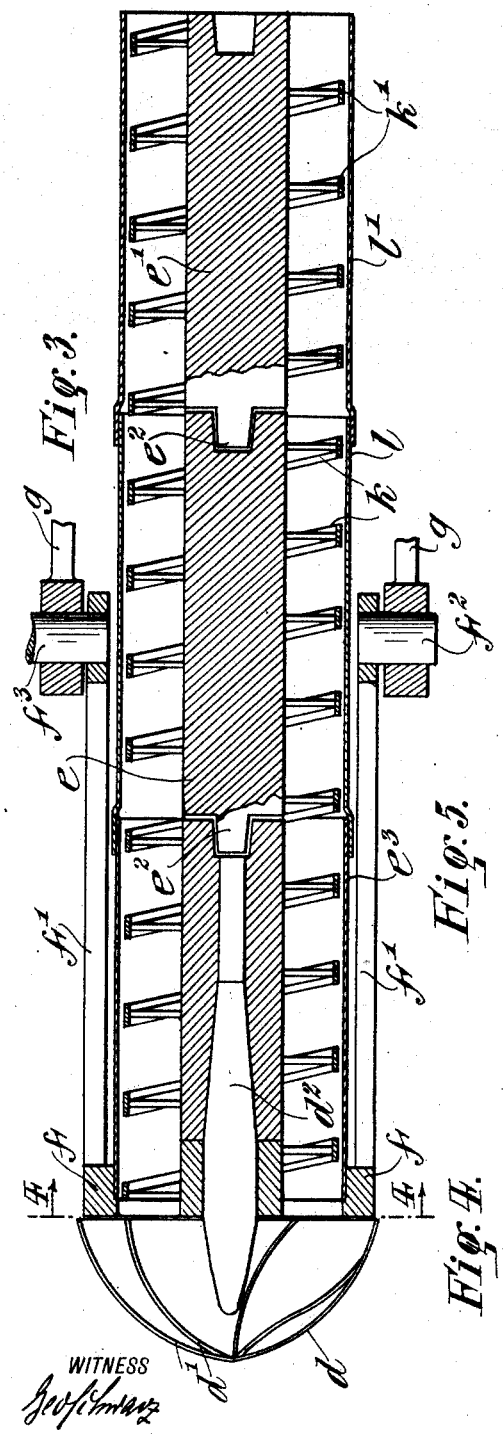
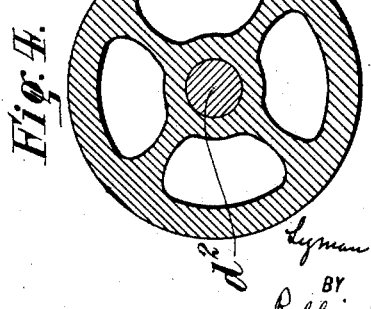
INVENTOR
Lyman C. Josephs, Jr.
BY
Redding & Greeley
ATTORNEYS

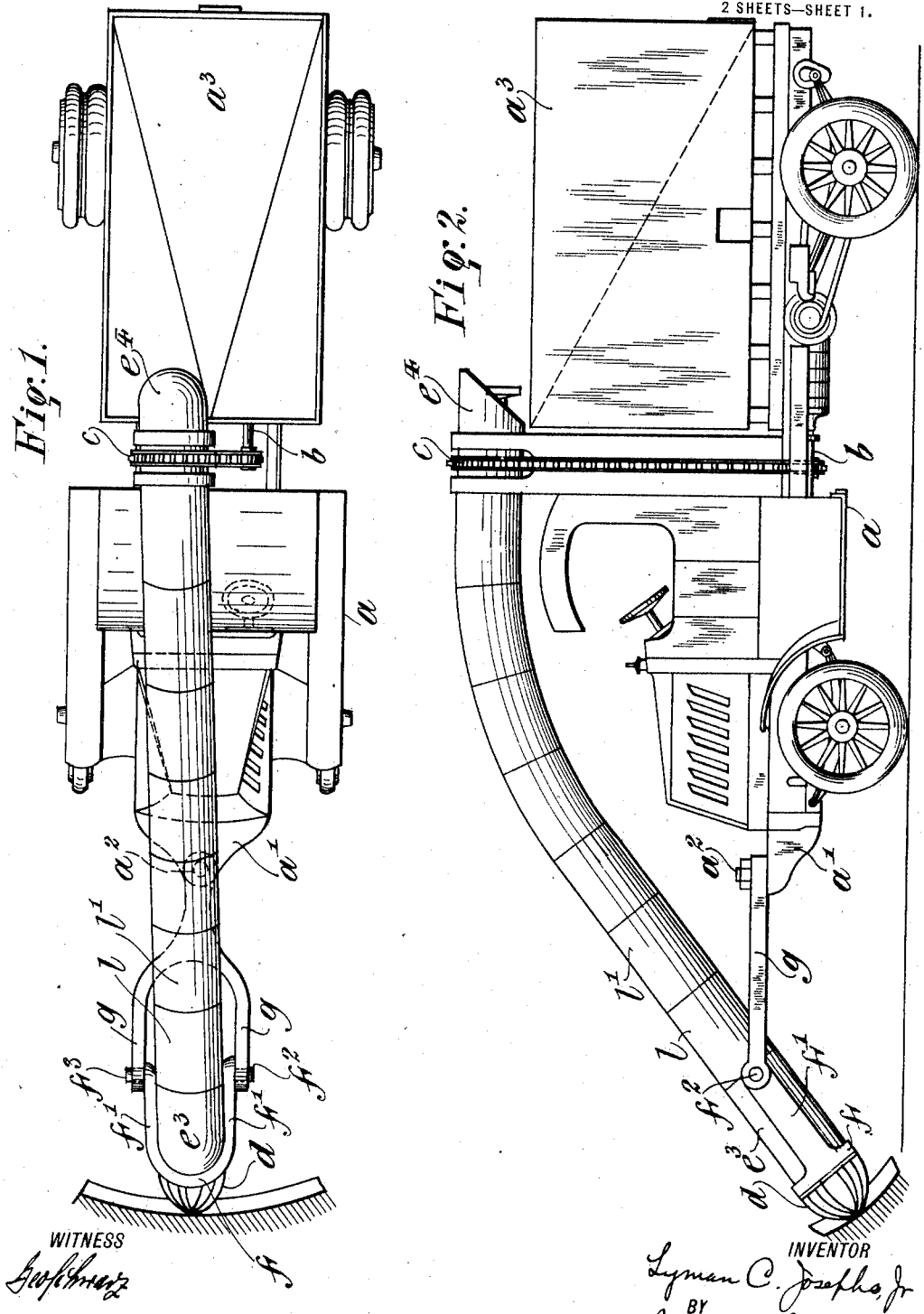

UNITED STATES PATENT OFFICE.

LYMAN COLT JOSEPHS, JR., OF NEW YORK, N. Y., ASSIGNOR TO INTERNATIONAL MOTOR COMPANY, OF NEW YORK, N. Y., A CORPORATION OF DELAWARE.

MOTOR-TRUCK EXCAVATOR.

1,388,650.   Specification of Letters Patent.   Patented Aug. 23, 1921.

Application filed May 27, 1920. Serial No. 384,540.

*To all whom it may concern:*

Be it known that I, LYMAN C. JOSEPHS, Jr., a citizen of the United States, residing in Flushing, in the borough of Queens of the city of New York, in the State of New York, have invented certain new and useful Improvements in Motor-Truck Excavators, of which the following is a specification, reference being had to the accompanying drawings, forming a part hereof.

This invention relates to an improved motor truck to which is applied a continuously operable device for excavating material or for loading material on to the truck. As the description proceeds it will be clear that while the term "excavating" is used for convenience it is evident that the operation contemplated is in no sense limited to this character of work but includes as well the loading operation in which material is transferred from a relatively remote point to the truck by means of a power operated conveyer.

Excavating, as now carried on, is usually done with a steam shovel the operation of which is, of course, intermittent, expensive and suitable only for very rough deep work. So far as is known, excavating, even with a shovel, has never been practised with the motor of a motor truck as the source of power. By the present invention it is sought to provide a motor truck with a continuously operable power driven conveyer carried thereon, the power being derived from the motor of the truck. Other types of excavators or loading devices than those herein shown might be usefully employed in the new combination, but a continuously operable screw conveyer having a cutting head adapted to bite into a bank of material, such as dirt or snow, forms the preferred embodiment of this invention. The conveyer employed is mounted on the motor truck and the pipe sections thereof are articulated and so supported as to permit the cutting head to be moved in both horizontal and vertical planes to work over the largest possible face of excavation. The movements of this head are controlled, in accordance with the present invention, by an attendant. The screw sections of the conveyer within the pipe are interconnected by loose joints permitting universal movement thereof and the transmission of the rotative movement imparted thereto by suitable connections between one of said sections and the truck motor. The conveyer pipe terminates at a point of discharge over the truck body.

The preferred embodiment of the invention will be described with greater detail in connection with the accompanying drawings, in which—

Figure 1 is a view in plan showing somewhat conventionally the improved truck having associated therewith the improved excavating and loading device.

Fig. 2 is a view in side elevation of the truck shown in Fig. 1.

Fig. 3 is a detail view of a fragment of a suitable type of conveyer and cutting head showing means for supporting the conveyer movably.

Fig. 4 is a sectional view taken on the plane indicated by the line 4—4 of Fig. 3 and looking in the direction of the arrows.

Fig. 5 is a detail view of a suitable form of cutter head.

Fig. 6 is a view in plan of one type of manual control for the cutter head.

The invention consists, broadly, in bringing into combination with a motor truck an excavator which shall be driven selectively from the propelling motor of the truck. Secondarily, the invention resides in bringing into combination with such an excavating device a loading device whereby the material excavated or to be loaded can be conveyed on to the truck body in an operation performed continuously with the cutting of the material.

In the drawings the truck $a$ is shown as provided with a power shaft $b$, which may be the counter shaft of the transmission, extended beyond the casing but which will, in any embodiment, derive its power from the propelling motor for the truck. This power shaft $b$ is connected operatively, as through a chain $c$, with a cutter head $d$ by which it is proposed to carry on the excavating. In the embodiment of the invention illustrated the cutter head $d$ is formed with a plurality of generally spiral cutting blades $d'$ and this cutter is connected through its supporting shaft $d^2$ and a series of shaft sections $e$, $e'$, etc., with the driving chain $c$, whereby rotative movement of the shaft $b$ is transmitted to the rotary cutter head $d$. The supporting head $d^2$ for the cutter head is journaled in a bearing $f$ which may be carried on arms $f'$ formed with trunnions $f^2$, $f^3$ journaled in a yoke $g$ which is mounted on the truck frame $a'$. The yoke $g$ may be supported pivotally on the frame $a'$, as at $a^2$, so as to permit the yoke to swing in a horizontal plane. The trunnions $f^2$, $f^3$ of the arms $f'$ permit the cutter head $d$ to be swung in a vertical plane. To effect the horizontal and vertical movements of the cutter head $d$ in the manner described, one of the trunnions $f^3$ may be provided with a hand lever $i$ which will facilitate manual control of the position of the cutter head by an attendant. It will be evident to one skilled in the art that the particular means for supporting the cutter head adjustably might be changed within wide limits and that other means than those shown might be employed for bringing about the convenient control of the position of the cutter.

The construction thus far described brings out the broadest phase of the invention which resides in supporting a continuously operable cutter or excavator on a motor truck and actuated by the prime mover of the truck. Such a cutter or excavator is simple in construction and very inexpensive and is adapted to do much closer work than is possible with the known type of steam shovel. In the building of roads, for instance, it becomes very important oftentimes to take off a comparatively thin stratum of earth, perhaps not exceeding six or eight inches. A device of the character constituting this invention is well adapted for the purpose, being operated continuously by the motor of the truck on which it is supported and being under very close control by the attendant. The same advantages are characteristics of such a construction as provided for excavating snow. By bringing the excavator into combination with the motor truck of an accepted type, it becomes at once entirely feasible to move the excavator quickly over city streets to desired points for excavating snow at little expense. The capacity of such a device as is described is at least equal to the capacity of a steam shovel of much greater cost and far less mobility.

A further phase of the invention and a rather natural development thereof is the association with a cutter or excavator, of the type described, of a conveyer adapted to carry the material from the cutter head to the truck body. This is a feature which is of great convenience in the loading of truck bodies with materials, such as sand, gravel, snow or the like, and when excavating as such is being carried on, it provides in a single continuous operation for the removal of the material excavated. In carrying out this phase of the invention, the shaft sections $e$, $e'$ for propelling the cutter head $d$ are formed with conveyer screws $k$, $k'$, etc., respectively, and these sections are supported with proper bearing faces on the screws, within telescoping pipe sections $l$, $l'$, etc., respectively. The joints, such as $e^2$, between any two adjacent shaft sections $e$, $e'$ may be comparatively loose so as to permit universal movement and the pipe sections $l$, $l'$ are so interconnected as to conform within necessary limits to movements of the conveyer. The lowermost pipe section $e^3$ may have its end supported in the bearing $f$, so that any vertical or horizontal movement of the cutter head $d$ across the face of an excavation will find the pipe section in the same relation to the head to receive the material being excavated. The upper end section $e^4$ of the conveyer pipes may terminate at some point over a suitable body $a^3$ on the truck so that the material conveyed through the pipe sections will be delivered into the truck body.

In the operation of the device with some such conveying means as have been illustrated and described, it is evident that as the cutter is moved over the face of the excavation, the cutting blades $d'$ will throw the material into the pipe section $e^3$ and the various conveyer screws $k$, $k'$, etc., on the conveyer shaft sections $e$, $e'$, etc., will propel the material continuously through the pipe sections and discharge it into the truck body $a^3$. The operation is continuous so long as the power shaft $b$ of the truck motor is in operation and by proper control of the cutter head by the attendant any desired thickness of material over a large face of excavation can be cut out. When desired, of course, the apparatus may be used for loading purposes only. The construction is simple and inexpensive and by forming the conveyer in the manner described any one of the units thereof may be removed readily for purposes of replacement or repair.

The scope of the invention will appear from the appended claim.

I claim as my invention:

In a motor vehicle, in combination with the prime mover therefor, a power operated excavator head, a support therefor pivoted on the vehicle body and movable in a horizontal plane, a pivotal connection between the head and said support for movement of the head in a vertical plane, operative driving connections between said head and the prime mover and a conveyer pipe movable with the head and terminating in discharge position over the vehicle body.

This specification signed this 15th day of May A. D., 1920.

LYMAN COLT JOSEPHS, Jr.